United States Patent [19]

Ohtsuka

[11] Patent Number: 5,548,363
[45] Date of Patent: Aug. 20, 1996

[54] CAMERA WHICH SENSES IMPROPER FILM LOADING

[75] Inventor: Masanori Ohtsuka, Kanagawa-ken, Japan

[73] Assignee: Canon Kabushiki Kaisha, Tokyo, Japan

[21] Appl. No.: 394,216

[22] Filed: Feb. 24, 1995

Related U.S. Application Data

[63] Continuation of Ser. No. 840,515, Feb. 25, 1992, abandoned.

[30] Foreign Application Priority Data

Mar. 1, 1991 [JP] Japan .................................. 3-036161

[51] Int. Cl.⁶ .................................................. G03B 1/18
[52] U.S. Cl. ........................................ 354/173.1; 354/212
[58] Field of Search .................................. 354/21, 173.1, 354/173.11, 212, 213, 214, 215, 217, 218

[56] References Cited

U.S. PATENT DOCUMENTS

| | | | |
|---|---|---|---|
| 4,721,973 | 1/1988 | Harvey | 354/215 |
| 4,992,812 | 2/1991 | Smart | 354/212 X |
| 5,235,365 | 8/1993 | Takatori et al. | 354/173.11 |
| 5,255,034 | 10/1993 | Shimada et al. | 354/173.1 |

FOREIGN PATENT DOCUMENTS

282233  3/1990  Japan .

*Primary Examiner*—Howard B. Blankenship
*Attorney, Agent, or Firm*—Fitzpatrick, Cella, Harper & Scinto

[57] ABSTRACT

A camera includes a blank advance device for advancing in blank a given amount of a film in the direction of film winding after a leader part of the film is pulled out from a cartridge, a discrimination circuit for making a discrimination between the adequacy and inadequacy of the film advancing action of the blank advance device, and a first control circuit arranged to cause the film to be rewound until the leader part of the film comes to a given position if the film advancing action of the blank advance device is determined to be inadequate by the discrimination circuit after the operation of the blank advance device.

28 Claims, 7 Drawing Sheets

FIG.7

CAMERA WHICH SENSES IMPROPER FILM LOADING

This application is a continuation of prior application Ser. No. 07/840,515 filed on Feb. 25, 1992, now abandoned.

BACKGROUND OF THE INVENTION

1. Field of the Invention

This invention relates to a camera having an automatic film loading function.

2. Description of the Related Art

It has been known to impart an automatic film loading function to the film transport device of a camera. This function is performed by reading either some code provided on a film cartridge or the like or the position of a switch which turns on when the film cartridge is inserted into the camera body; and by automatically advancing the film in blank in the direction of winding o the film (hereinafter referred to as an automatic blank advance process) when the back lid of the camera is closed. Some of the known film transport devices are arranged to rewind the film automatically back to a given position if the film cannot be advanced by a given amount within a given period of time during the automatic blank advance process.

Meanwhile, Japanese Laid-Open Patent Application No. HEI 02-082233 has disclosed a method of completing the rewinding of the film with the leader part of the film left outside the film cartridge if the film is rewound with a manual rewinding switch turned on before a shot is not taken for any one frame after completion of the automatic blank advance process.

However, all the known film transport devices require that the photographer manually pull the film out from the cartridge to a given position before the automatic blank advance process. Therefore, the leader part of the film is sometimes inserted too much or set in a wrong position deviating from a correct setting position. In such a case, the film comes to a stop halfway in the automatic blank advance process or cannot be moved at all by the automatic blank advance process.

With the film coming to a stop halfway in the automatic blank advance process, the film might be exposed to light or damaged when the photographer takes the film out from the camera. Further, if the film is rewound with the manual rewinding switch turned on, the leader part of the film tends to be completely taken into the film cartridge, thus causing inconveniences. Even in the case of the film transport device of the kind arranged to leave the leader part of the film outside the cartridge after completion of film rewinding, the photographer is required to have the trouble of taking out the film by opening the back lid of the camera, adjusting the film length as desired, setting the film in position again and closing the back lid. Further, with the film subjected to the automatic blank advance process after the film is thus set in position again, the blank advance process is apt to fail again because the film has been pulled out and set in position by the photographer.

SUMMARY OF THE INVENTION

It is an object of this invention to provide a camera which is arranged such that, in a case where an automatic blank advance process has failed to advance the film in blank by a given amount, the camera is capable of stably performing a next automatic blank advance process by temporarily rewinding a leader part of the film to a predetermined position.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
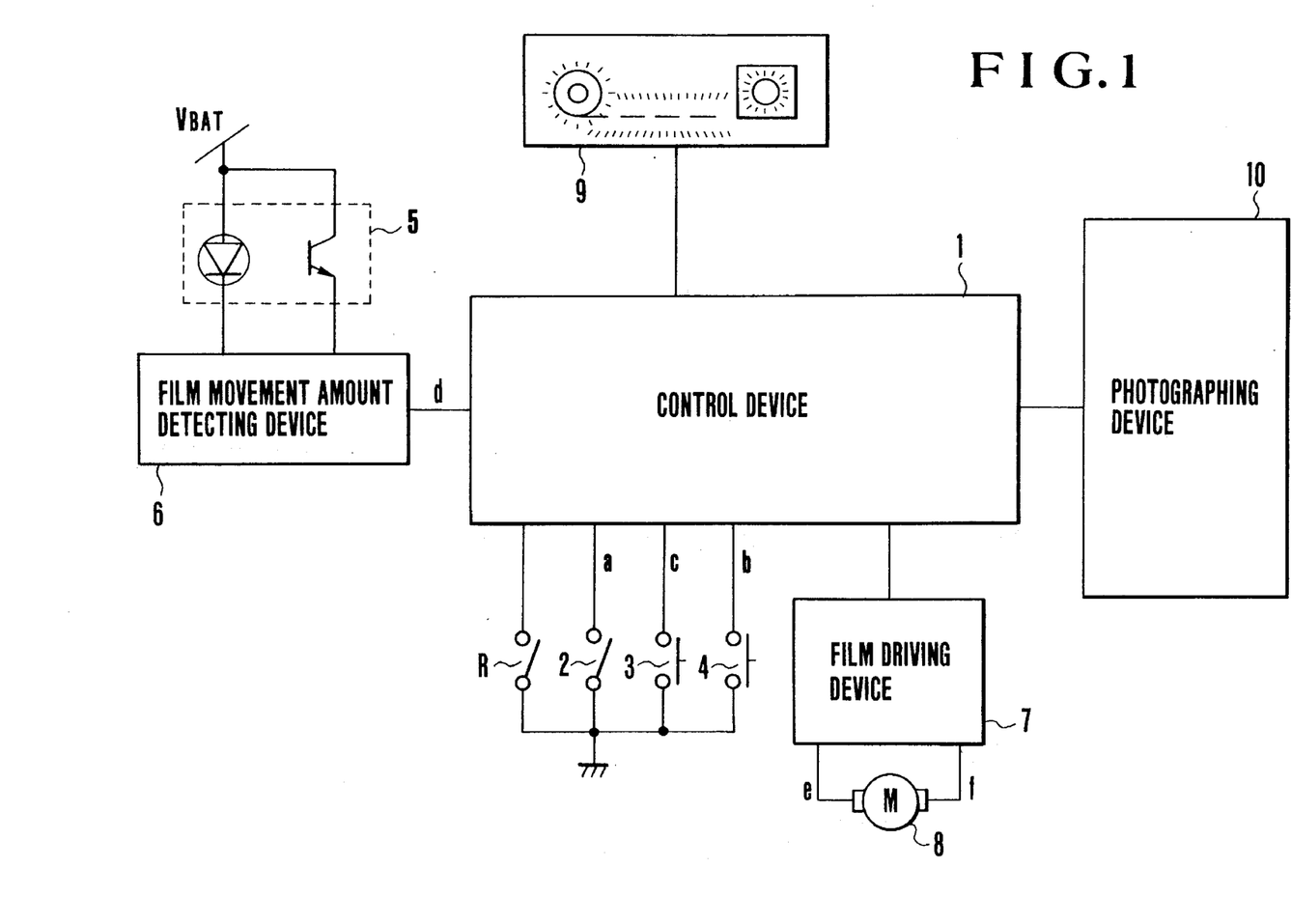
FIG. 1 is a block diagram showing the concept of an embodiment of this invention.

FIG. 1 schematically shows the concept and feature of this invention. In FIG. 1, a reference numeral 1 denotes a control device which is arranged to perform sequence control and arithmetic operations for an optical apparatus, such as a camera. Reference numeral 2 denotes a first detection means which is either a switch arranged to detect a DX code provided on a film cartridge or a switch arranged to turn on when the camera is loaded with the film. Reference numeral 3 denotes a switch which is arranged, as a third detection means, to turn on when the film comes to a position most suited for an automatic blank advance process after the film is pulled out from the cartridge. Reference numeral 4 denotes a switch which is arranged, as a second detection means, to turn on and off when the back lid of the camera is opened and closed. Reference numeral 5 denotes a photo-interrupter which is arranged to detect the movement of the film. A release switch R is provided for initiating a photographing operation.

A film movement amount detecting device 6 is arranged, as a fourth detection means, to supply a signal indicative of one frame amount of film movement to the control device 1 upon detection of a signal outputted from the photo-interrupter 5. A film winding means such as driving device 7, is arranged to wind or rewind the film by applying a current to a film transporting motor 8 in the forward or reverse direction. A display device 9 is arranged to display the movement and the number of frames of the film and any failure of the automatic blank advance process. Reference numeral 10 denotes a known photographing device provided for the camera.

Figure 2:
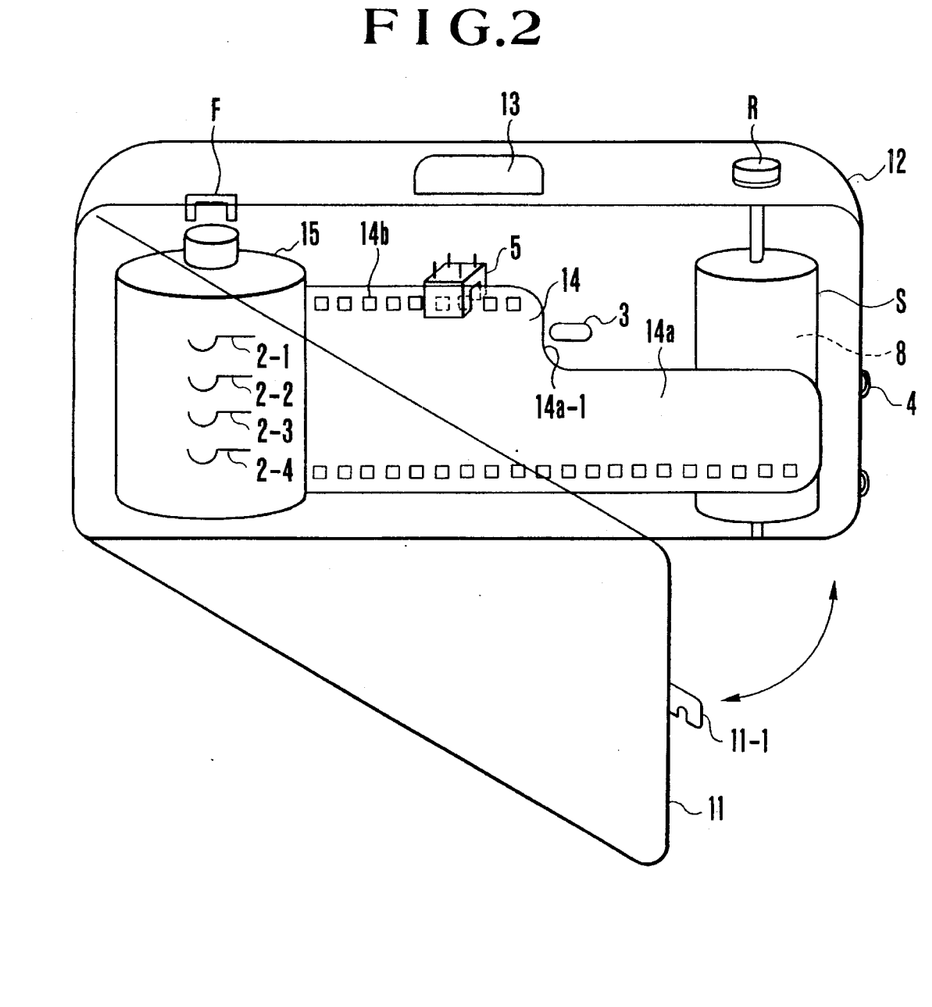
FIG. 2 schematically shows the arrangement of a detecting device in the embodiment of the invention.

FIG. 2 shows by way of example the allocation of a group of detection means which feature this invention. In FIG. 2, parts indicated by the same reference numerals as those of FIG. 1 perform the same functions as the parts shown in FIG. 1. The illustration includes a back lid 11; a camera body 12; a viewfinder 13; a film 14; a film leader part 14a; and a film cartridge 15.

The switch 2 which is the first detection means is arranged to detect the presence or absence of the film cartridge 15 by having conductivity between a ground pattern 2-4 and other code pattern 2-1, 2-2 or 2-3 when the film cartridge 15 is loaded on the camera body 12. The second detection means which is represented by the switch 4 is arranged to detect that the film 14 has been shielded from light by having the switch 4 turned on by a projection 11-1 when the back lid 11 is closed. The third detection means which is represented by the switch 3 is arranged to detect the position of the film 14 with the switch 3 pushed and turned on by the film 14 when the film 14 is pulled out and an end 14a-1 of the film leader part 14a comes to the position of the switch 3. The fourth detection means is located at the perforation 14b of the film 14 to detect the amount of movement of the film 14 by counting the number of holes of the film perforation 14b while detecting light blocking/transmitting states by means of the photo-interrupter 5. A spool S is arranged to take up the film 14. The film transporting motor 8 is disposed within a spool S. The motor 8 is arranged to cause the film 14 to be taken up on the spool S by rotating forward to rotate the spool S counterclockwise and to cause the film 14 to be rewound by rotating backward to rotate a rewinding fork F clockwise and thus rotate a shaft of the cartridge 15.

Figure 3:
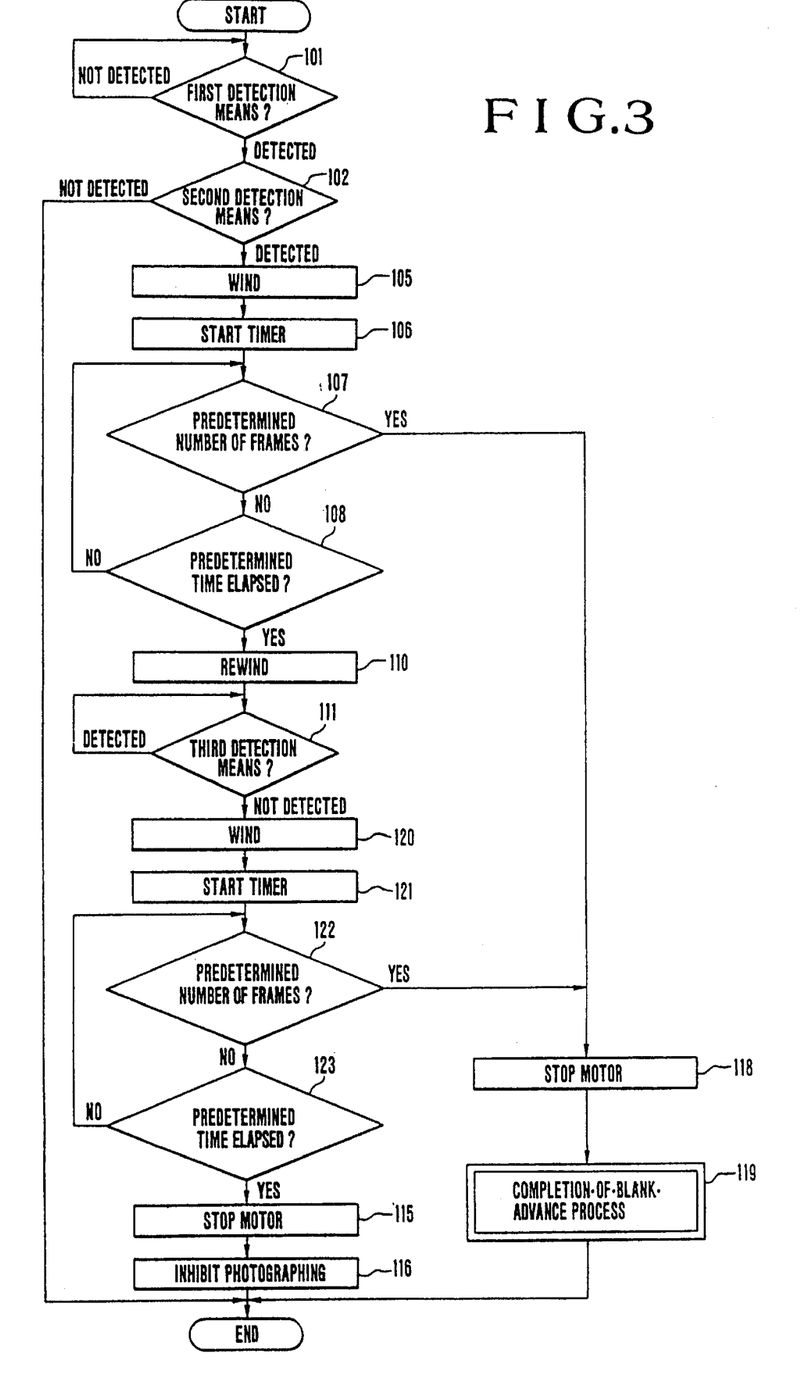
FIG. 3 is a flowchart showing the operation of the same embodiment.
Figure 4A:
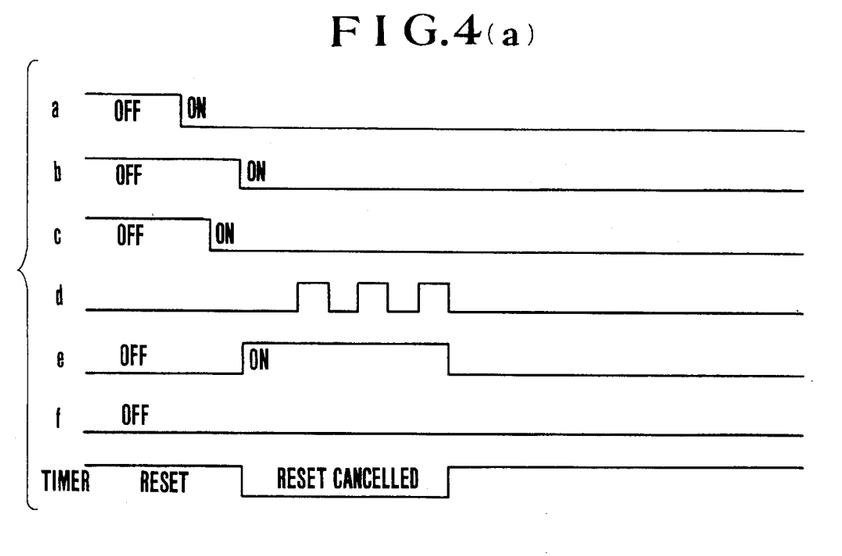
FIGS. 4(a) and 4(b) are timing charts showing the flow of operation of FIG. 3.

Next, the operation of the camera shown in FIG. 1 is described with reference to FIG. 3 which is a flowchart and FIGS. 4(a) and 4(b) which are timing charts. At a step #101: When the film cartridge 15 is loaded on the camera, the switch 2 (the first detection means) turns on to supply a signal "a" to the control device 1. Step #102: The switch 3 turns on when the film leader part 14a is set in a given position under this condition. When the back lid 11 is closed, the switch 4 turns on to output a signal "b". Step #105: Then, the control device 1 sends a signal to the film driving device 7 to make the level of an output signal "e" of the film driving device 7 high. The high-level signal "e" causes the film transporting motor 8 to rotate forward for a film winding action. Step #106: At the same time, a timer which is disposed within the control device 1 is released from a reset state and allowed to start. If the film 14 is then adequately set and is normally taken up, the photo-interrupter 5 detects the movement of the film perforation 14b as shown in FIG. 4(a). The film movement amount detecting device 6 outputs a signal "d" when a number of the film perforation holes which correspond to one frame amount of film (8, for example) are counted. The control circuit 1 counts the number of pulses of the signal "d". When a given number of frames, for example, 3, are counted (step #107) within a given period of time (step #108), the motor 8 is brought to a stop (step #118) to terminate an automatic blank advance process (step #119).

Figure 4B:
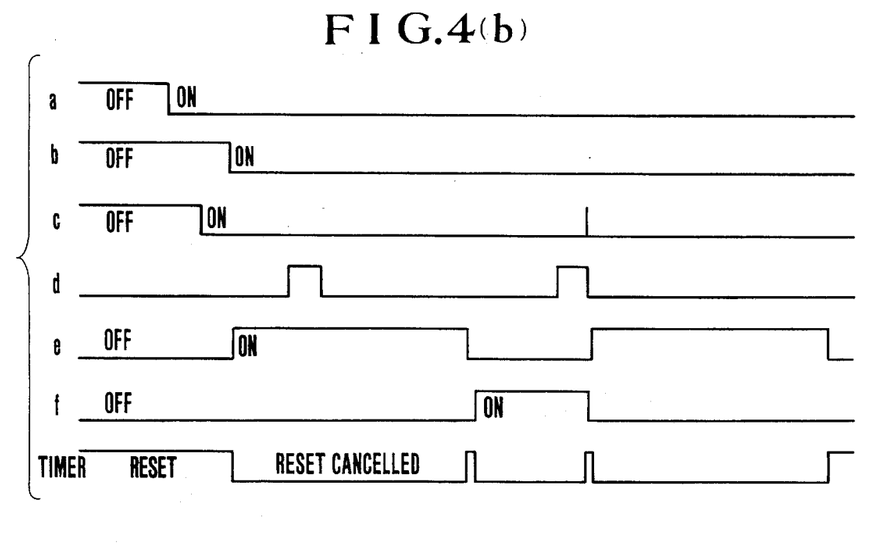

If the film is not adequately set and the film winding action comes to a stop halfway in the automatic blank advance process despite the fact that a film-winding current is applied to the motor 8, the camera operates as shown in FIG. 4(b). The photo-interrupter 5 detects the film perforation 14b. When a number of film perforation holes corresponding to one frame amount of film are counted, the film movement amount detecting device 6 outputs the signal "d". However, since the film has come to a stop halfway in this instance, the signal "d" remains at a low level. Then, at the step #108, the control device 1 makes a check for the lapse of a given period of time. Step #110: If a number of perforation holes corresponding to a given number of frames are not counted even after the lapse of the given period of time, the control device 1 sends a signal to the film driving device 7 to cause the film driving device 7 to make the level of the signal "e" low and that of another signal "f" high. As a result, a current is applied to the motor 8 in the direction of rewinding the film (reverse direction). Step #111: The film moves in the rewinding direction. The film movement amount detecting device 6 outputs its signal. When the film 14 is rewound to a point where the automatic blank advance process can be most easily carried out, the switch 3 (the third detection means) turns off. Step #120: Then, the control device 1 causes a current to be applied to the motor 8 again in the direction of winding the film. Step #121: The timer is again temporarily reset and, after that, is restarted. Steps #122 and #123: If a portion of the film corresponding to the given number of frames is again not wound (taken up) within the given period of time, the flow of operation comes to a step #115. At the step #115: The film transporting motor 8 is stopped and the automatic blank advance process is brought to an end. Further, since the film 14 cannot be adequately advanced in blank in this case, the control device 1 inhibits the photographing device 10, at a step #116, from performing any photographing operation (such as opening and closing of a shutter) even if the release switch R is operated. Under this condition, therefore, the photographer can be informed of the failure of the automatic blank advance process and can be saved from taking useless actions as the shutter makes no sound even if the release switch R is operated to take a shot without knowing the failure of the automatic blank advance process.

Figure 5:
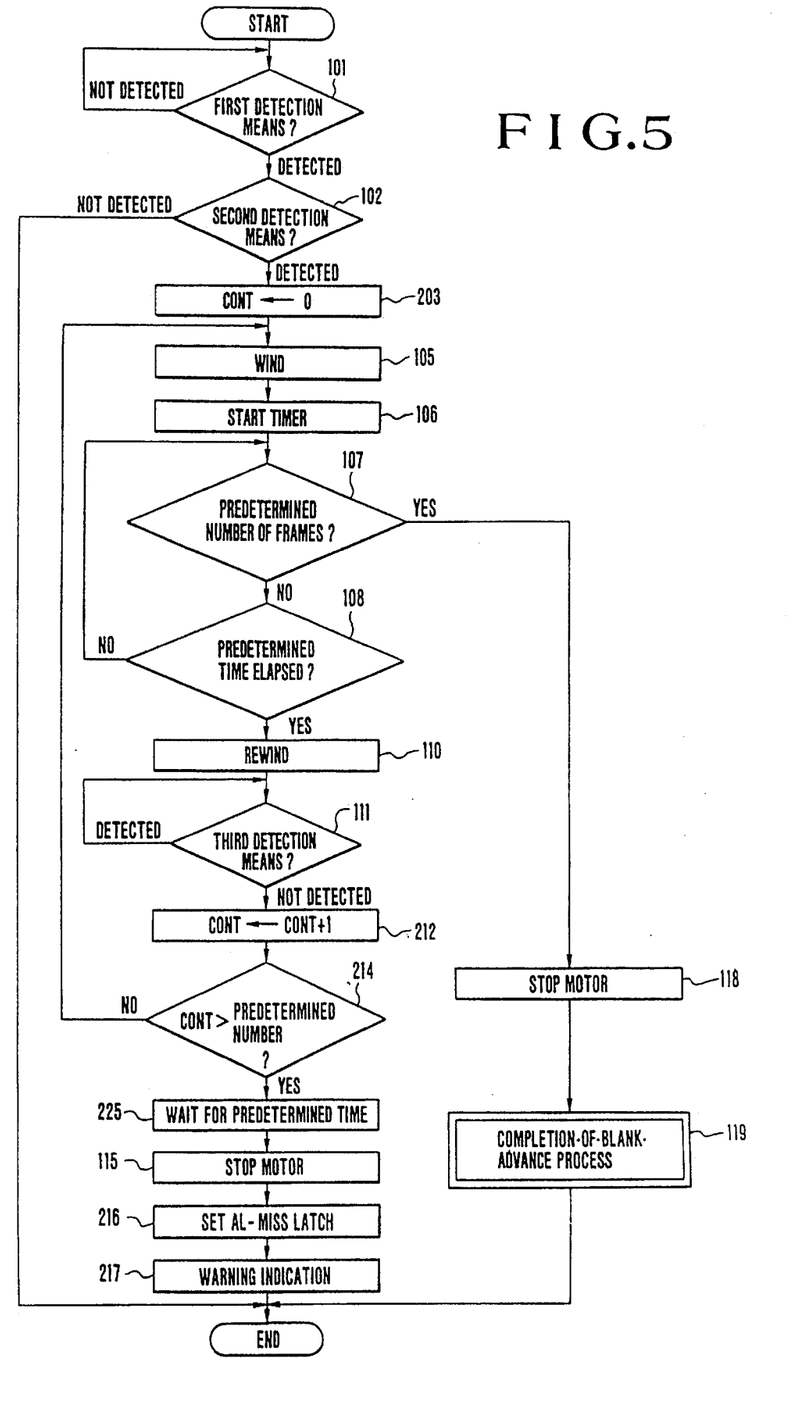
FIG. 5 is a flowchart showing the operation of another embodiment of this invention.

FIG. 5 is a flowchart showing the operation of another embodiment of this invention. In FIG. 5, steps having the same step numbers as in FIG. 3 show the same control processes. The details of these steps are, therefore, omitted from the following description.

Step #102: When the second detection means outputs a detection signal with the back lid of the camera closed, the flow comes to a step #203. Step #203: The control device 1 sets at zero a count number for counting the number of times for which the automatic blank advance process is to be repeated. Step #105: A current is applied to the film transporting motor 8 in the film winding direction. Steps #107 and #108: If a portion of the film corresponding to a given number of frames is not wound up within a given period of time, the flow comes to a step #110. Step #110: The control device 1 causes a current to be applied to the film transporting motor 8 in the direction of rewinding the film. The film is rewound. Step #111: If the film is rewound to a point where the automatic blank advance process can be most easily carried out, the flow comes to a step #212. Step #212: The count number for the repetition of the automatic blank advance process is incremented by one. Step #214: A check is made to find if the count number thus obtained has exceeded a predetermined number. If not, the flow comes back to the step #105 to repeat the automatic blank advance process once again. In a case where the film cannot be advanced in blank even if the automatic blank advance process has been repeated more than the predetermined number of times, some of the mechanisms of the camera is most likely out of order. In this instance, therefore, the flow of operation comes to a step #225. Step #225: The film is first rewound to a point where the film can be easily pulled out (a state in which the film leader part 14a is removable from the spool S). Step #115: The film transporting motor 8 is brought to a stop. Step #216: An automatic loading miss latch which is for inhibiting a photographing operation is set up. Step #217: The display device 9 is caused to provide a warning indication. Further, like in the case of the step #116 in FIG. 3, with the latch set up at the step #216, no photographing operation is allowed even if the release switch R is operated.

Figure 6:
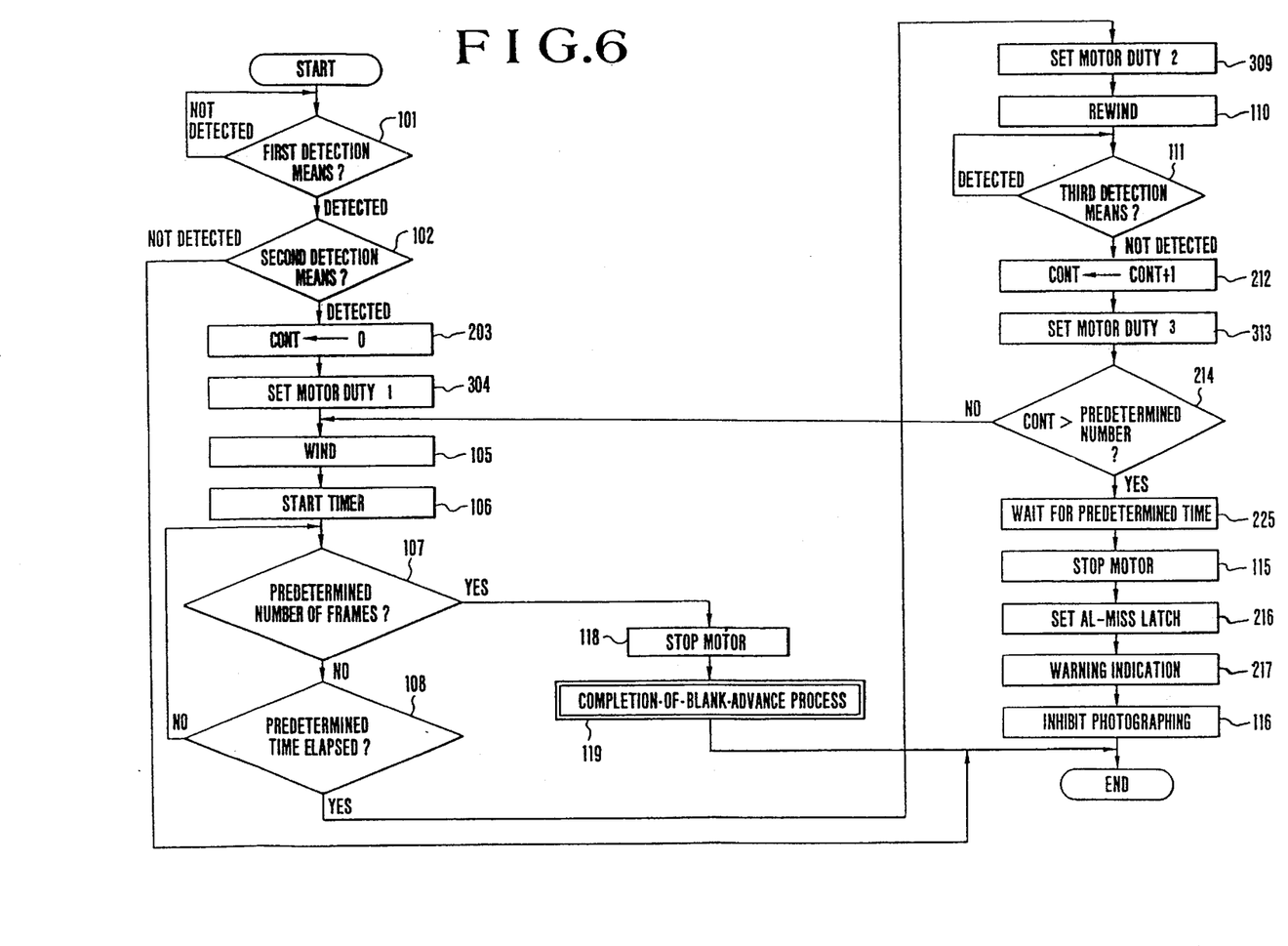
FIG. 6 is a flowchart showing the operation of a further embodiment of the invention.

FIG. 6 is a flowchart showing the operation of a further embodiment of this invention. The flow shown in FIG. 6 is basically the same as the flow of FIG. 5. However, this embodiment includes additional steps #304, #309 and #313 at which the duty ratio of the motor is changed. More specifically, at the step #304, the automatic blank advance process is performed with a motor driving duty ratio for normal winding. In the event of the failure of the automatic blank advance process, the flow comes to the step #309. At the step #309: The motor driving duty ratio is set at such a value as to slowly move the motor for accurately obtaining a film stopping position. At the step #313: The motor driving duty ratio is set at such a value that has a longer current applying time than at the step #304 thereby increasing a driving torque in such a way as to enhance the power of the automatic blank advance process for the purpose of increasing the probability of success of the repeated blank advance process.

Figure 7:
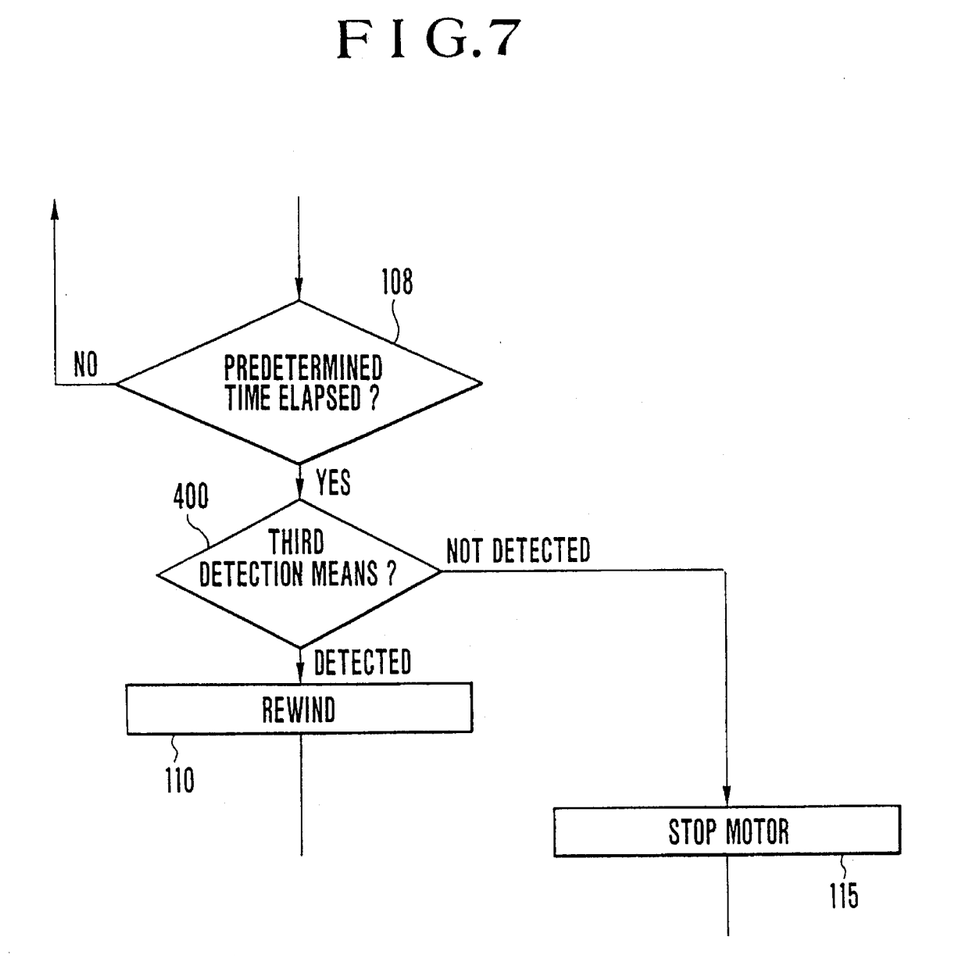
FIG. 7 is a flowchart showing the operation of a still further embodiment of the invention.

FIG. 7 is a flowchart showing the operation of a still further embodiment of this invention. The flow of operation shown in FIG. 7 is the same as the flow of FIG. 5 except the provision of an additional step #400. At the step #400: If the third detection means (the switch 3) is in an undetected state (a state of not having the film 14 located on the switch 3) even after the film winding action, the flow of operation comes to the step #115 to bring the motor 8 to a stop without performing the film rewinding action at the step #110. In other words, the embodiment is arranged as follows: In a case where the film 14 is pulled out too short in loading and cannot be correctly advanced in blank even by repeating the automatic blank advance process, the film transporting motor 8 is brought to a stop at that point of time.

As apparent from the foregoing, the embodiments described are arranged to be capable of successfully carrying out a next attempt to perform the automatic blank advance process by temporarily rewinding the film to a position suited for the next attempt in the event of a failure of the automatic blank advance process. This arrangement ensures a successful automatic blank advance even if the film is pulled out to an inappropriate position in loading the camera with the film. Further, the embodiment not only has an improved operability but also permits speedy commencement of a photographing operation by virtue of the arrangement to repeat the automatic blank advance process after the temporary film rewinding action.

What is claimed is:

1. A camera comprising:
   a) blank advance means for advancing in blank a predetermined amount of a film in a direction of winding the film after a leader part of the film is pulled out from a cartridge;
   b) discrimination means for discriminating whether an advancing action of the film advanced in blank by said blank advance means is adequate by detecting an amount of film movement by a detection device which outputs a predetermined signal every time the film moves a predetermined amount and detects the amount of the film movement from the number of times a signal is outputted; and
   c) first control means for causing the film to be automatically rewound until the leader part of the film reaches a predetermined position outside the cartridge if the advancing action of the film is determined to be inadequate by said discrimination means after an operation of said blank advance means.

2. A camera according to claim 1, further comprising second control means for causing said blank advance means to operate again to blank advance the film after the film has been rewound to the predetermined position by said first control means.

3. A camera according to claim 2, wherein said second control means is arranged to cause a rewinding action of the film by said first control means and the advancing action of the film by said blank advance means to be repeated for a predetermined number of times if the advancing action of the film is determined to be inadequate by said discrimination means even after said blank advance means is caused to operate again.

4. A camera according to claim 3, further comprising third control means for inhibiting an exposure action if the advancing action of the film is determined to be inadequate by said discrimination means.

5. A camera according to claim 2, further comprising third control means for inhibiting an exposure action if the advancing action of the film is determined to be inadequate by said discrimination means.

6. A camera according to claim 2, wherein a power of the advancing action of the film by said blank advance means is increased when said blank advance means is caused to operate again by said second control means.

7. A camera according to claim 3, wherein a power of the advancing action of the film by said blank advance means is increased when said blank advance means is caused to operate again by said second control means.

8. A camera according to claim 6, wherein said power of the advancing action of the film is increased by increasing a driving torque of a drive source.

9. A camera according to claim 7, wherein said power of the advancing action of the film is increased by increasing a driving torque of a drive source.

10. A camera according to claim 1, wherein said discrimination means is arranged to determine that the advancing action of the film is inadequate, when the film is not advanced to an extent corresponding to a predetermined number of frames within a predetermined period of time.

11. A camera according to claim 2, wherein said discrimination means is arranged to determine that the advancing action of the film is inadequate, when the film is not advanced to an extent corresponding to a predetermined number of frames within a predetermined period of time.

12. A camera according to claim 3, wherein said discrimination means is arranged to determine that the advancing action of the film is inadequate, when the film is not advanced to an extent corresponding to a predetermined number of frames within a predetermined period of time.

13. A camera according to claim 4, wherein said discrimination means is arranged to determine that the advancing action of the film is inadequate, when the film is not advanced to an extent corresponding to a predetermined number of frames within a predetermined period of time.

14. A camera according to claim 1, wherein said blank advance means is arranged to sense the closure of a back lid and to actuate a motor employed as a drive source to move the film in the direction of film winding when the back lid is closed.

15. A camera according to claim 10, wherein said blank advance means is arranged to sense the closure of a back lid and to actuate a motor employed as a drive source to move the film in the direction of film winding when the back lid is closed.

16. A camera according to claim 2, wherein said second control means causes the film to be advanced in blank by controlling a film winding motor included in said blank advance means, said film winding motor serving as a drive source.

17. A camera according to claim 3, wherein said second control means causes the film to be advanced in blank by controlling a film winding motor included in said blank advance means, said film winding motor serving as a drive source.

18. A camera according to claim 1, wherein said blank advance means comprises a motor serving as a drive source, and wherein the film is driven in a film winding direction by rotation of said motor in one direction and driven in a film rewinding direction by rotation of said motor in another direction.

19. A camera according to claim 2, wherein said blank advance means comprises a motor serving as a drive source, and wherein the film is driven in a film winding direction by rotation of said motor in one direction and driven in a film rewinding direction by rotation of said motor in another direction.

20. A camera according to claim 3, wherein said blank advance means comprises a motor serving as a drive source, and wherein the film is driven in a film winding direction by rotation of said motor in one direction and driven in a film rewinding direction by rotation of said motor in another direction.

21. A camera according to claim 5, wherein said blank advance means comprises a motor serving as a drive source, and wherein the film is driven in a film winding direction by rotation of said motor in one direction and driven in a film rewinding direction by rotation of said motor in another direction.

22. A camera according to claim 6, wherein said blank advance means comprises a motor serving as a drive source, and wherein the film is driven in a film winding direction by rotation of said motor in one direction and driven in a film rewinding direction by rotation of said motor in another direction.

23. A camera according to claim 1, wherein said first control means comprises position detecting means for detecting a position of the leader part of the film, and wherein said position detecting means detects said predetermined position where the advancing action of the film can be adequately performed with the leader part of the film having been pulled out from the cartridge.

24. A camera according to claim 23, further comprising second control means for causing said blank advance means to operate again to blank advance the film after the film has been rewound to the predetermined position by said first control means.

25. An optical apparatus comprising:
a) winding means for winding a film after a leader part of the film is pulled out from a cartridge;
b) discrimination means for discriminating whether a winding action of the film by said winding means is adequate by detecting an amount of winding action of the film by a detection device which detects the amount of winding action of the film by counting signals corresponding to a predetermined amount of winding action of the film; and
c) first control means for causing the film to be automatically rewound until the leader part of the film reaches a predetermined position outside the cartridge if the winding action of the film is determined to be inadequate by said discrimination means after an operation of said winding means.

26. An optical apparatus according to claim 25, further comprising second control means for causing said winding means to operate again to wind the film after the film has been rewound to the predetermined position by said first control means.

27. An optical apparatus according to claim 26, wherein said second control means is arranged to cause a rewinding action of the film by said first control means and a winding action of the film by said winding means to be repeated a predetermined number of times if the winding action of the film is determined to be inadequate by said discrimination means after said winding means has been caused to operate again.

28. An optical apparatus according to claim 26, wherein a power of a winding action of the film by said winding means is increased when said winding means is caused to operate again by said second control means.

* * * * *

UNITED STATES PATENT AND TRADEMARK OFFICE
CERTIFICATE OF CORRECTION

PATENT NO. : 5,548,363
DATED : August 20, 1996
INVENTOR(S) : MASANORI OHTSUKA

It is certified that error appears in the above-indentified patent and that said Letters Patent is hereby corrected as shown below:

On the title page, item [75],
"Kanagawa-ken" should read --Yokohama--.

Column 1

Line 19, "o" should be deleted.

Column 4

Line 55, "is" should read --are--.

Signed and Sealed this

Twenty-fourth Day of December, 1996

Attest:

BRUCE LEHMAN

Attesting Officer    Commissioner of Patents and Trademarks